United States Patent
Aliferis et al.

(10) Patent No.: US 9,858,533 B2
(45) Date of Patent: Jan. 2, 2018

(54) DATA ANALYSIS COMPUTER SYSTEM AND METHOD FOR CONVERSION OF PREDICTIVE MODELS TO EQUIVALENT ONES

(71) Applicants: Konstantinos (Constantin) F. Aliferis, Astoria, NY (US); Alexander Statnikov, New York, NY (US); Lawrence Fu, Long Islang City, NY (US); Yin Aphinyanaphongs, New York, NY (US)

(72) Inventors: Konstantinos (Constantin) F. Aliferis, Astoria, NY (US); Alexander Statnikov, New York, NY (US); Lawrence Fu, Long Islang City, NY (US); Yin Aphinyanaphongs, New York, NY (US)

( * ) Notice: Subject to any disclaimer, the term of this patent is extended or adjusted under 35 U.S.C. 154(b) by 411 days.

(21) Appl. No.: 14/216,021

(22) Filed: Mar. 17, 2014

(65) Prior Publication Data
US 2014/0279760 A1    Sep. 18, 2014

Related U.S. Application Data

(60) Provisional application No. 61/792,518, filed on Mar. 15, 2013.

(51) Int. Cl.
*G06F 15/18*    (2006.01)
*G06N 99/00*    (2010.01)
(Continued)

(52) U.S. Cl.
CPC ........... *G06N 99/005* (2013.01); *G06N 5/043* (2013.01); *G06N 7/005* (2013.01)

(58) Field of Classification Search
CPC combination set(s) only.
See application file for complete search history.

(56) References Cited

U.S. PATENT DOCUMENTS 7,529,737 B2 *  5/2009  Aphinyanaphongs  G06F 17/30705
8,275,772 B2 *  9/2012  Aphinyanaphongs  G06F 17/3071
                                                                    707/738
(Continued)

OTHER PUBLICATIONS

Jean-Philippe Pellet, "Effective Causal Analysis, Methods for Strucure Learning and Explanations", phD dissertation published for Ing. Info. Dipl. EPF, by Ecole Polytechnique Federale de Lausanne, Diss. ETH No. 19158, 2010, pp. 1-175.*
(Continued)

*Primary Examiner* — Michael B Holmes
(74) *Attorney, Agent, or Firm* — Laurence Weinberger

(57) ABSTRACT

The present invention addresses two ubiquitous and pressing problems of modern data analytics technology. Many modern pattern recognition technologies produce models with excellent predictivity but (a) they are "black boxes", that is they are opaque to the user; (b) they are too large, and/or expensive to execute in less powerful computing platforms. The invention "opens up" a black box model by converting it to a compact and understandable model that is functionally equivalent. The invention also converts a predictive model into a functionally equivalent model into a form that can be implemented and deployed more easily or efficiently in practice. The benefits include: model understandability and defensibility of modeling. A particularly interesting application is that of understanding the decision making of humans, comparison of the behavior of a human or computerized decision process against another and use to enhance education and guideline compliance/adherence detection and improvement. The invention can be applied to practically any field where predictive modeling (classification and regression) is desired because it relies on extremely broad distributional assumptions that are valid in numerous fields.

7 Claims, 4 Drawing Sheets

(51) Int. Cl.
*G06N 5/04* (2006.01)
*G06N 7/00* (2006.01)

(56) References Cited

U.S. PATENT DOCUMENTS

| | | | | |
|---|---|---|---|---|
| 8,527,442 B2* | 9/2013 | Fu | ............... | G06N 99/005 706/46 |
| 8,832,002 B2* | 9/2014 | Fu | ............... | G06N 99/005 706/12 |
| 9,772,741 B2* | 9/2017 | Aliferis | ............ | G06F 3/0481 |
| 2005/0289199 A1* | 12/2005 | Aphinyanaphongs | ............ | G06F 17/30705 |
| 2009/0077068 A1* | 3/2009 | Aphinyanaphongs | ............ | G06F 17/3071 |
| 2009/0157585 A1* | 6/2009 | Fu | ............... | G06N 99/005 706/46 |
| 2010/0217731 A1* | 8/2010 | Fu | ............. | G06F 17/30705 706/20 |
| 2014/0278339 A1* | 9/2014 | Aliferis | ............ | G06N 99/005 703/22 |
| 2014/0279760 A1* | 9/2014 | Aliferis | ............ | G06N 99/005 706/12 |
| 2014/0279761 A1* | 9/2014 | Aliferis | ............ | G06Q 10/00 706/12 |
| 2014/0279794 A1* | 9/2014 | Aliferis | ............ | G06F 3/0481 706/46 |

OTHER PUBLICATIONS

Jose M. Pena, Roland Nilsson, Johan Bjorkegren, Jesper Tegner, "Towards scalable and data efficient learning of Markov boundaries", International Journal of Approximate Reasoning, vol. 45, 2007, pp. 211-232.*

Xiaotong Lin, "Bayesian Network Learning and Applications in Bioinformatics", phd Thesis published by Departmetn of Electrical Engineering and Computer Science, Gragudate School of University of Kansas, 2012, pp. 1-110.*

A simplified model predictive control for open-winding PMSM Chong Sun; Dan Sun; Zhihao Zheng 2017 20th International Conference on Electrical Machines and Systems (ICEMS) Year: 2017 pp. 1-6 IEEE Conference Publications.*

Two-Vector-Based Model Predictive Torque Control Without Weighting Factors for Induction Motor Drives Yongchang Zhang; Haitao Yang IEEE Transactions on Power Electronics Year: 2016, vol. 31, Issue: 2 pp. 1381-1390 IEEE Journals & Magazines.*

Model-Predictive Flux Control of Induction Motor Drives With Switching Instant Optimization Yongchang Zhang; Haitao Yang IEEE Transactions on Energy Conversion Year: 2015, vol. 30, Issue: 3 pp. 1113-1122 IEEE Journals & Magazines.*

An improved two-vectors-based model predictive torque control without weighting factors for induction motor drives Yongchang Zhang; Haitao Yang 2014 17th International Conference on Electrical Machines and Systems (ICEMS) Year: 2014 pp. 2766-2772 IEEE Conference Publications.*

* cited by examiner

| Feature Set | Method | AUC |
|---|---|---|
| Full Feature Set | SVM | 0.98 |
| | Decision Tree | 0.94 |
| MB Feature Set | SVM | 0.95 |
| | Decision Tree | 0.95 |

Figure 2

DATA ANALYSIS COMPUTER SYSTEM AND METHOD FOR CONVERSION OF PREDICTIVE MODELS TO EQUIVALENT ONES

Benefit of U.S. Provisional Application No. 61/792,518 filed on Mar. 15, 2013 is hereby claimed.

BACKGROUND OF THE INVENTION

Field of Application

The field of application of the invention is data analysis especially as it applies to (so-called) "Big Data" (see subsection 1 "Big Data and Big Data Analytics" below). The methods, systems and overall technology and knowhow needed to execute data analyses is referred to in the industry by the term data analytics. Data analytics is considered a key competency for modern firms [1]. Modern data analytics technology is ubiquitous (see sub-section 3 below "Specific examples of data analytics application areas"). Data analytics encompasses a multitude of processes, methods and functionality (see sub-section 2 below "Types of data analytics").

Data analytics cannot be performed effectively by humans alone due to the complexity of the tasks, the susceptibility of the human mind to various cognitive biases, and the volume and complexity of the data itself. Data analytics is especially useful and challenging when dealing with hard data/data analysis problems (which are often described by the term "Big Data"/"Big Data Analytics" (see sub-section 1 "Big Data and Big Data Analytics").

1. Big Data and Big Data Analytics

Big Data Analytics problems are often defined as the ones that involve Big Data Volume, Big Data Velocity, and/or Big Data Variation [2].

- Big Data Volume may be due to large numbers of variables, or big numbers of observed instances (objects or units of analysis), or both.
- Big Data Velocity may be due to the speed via which data is produced (e.g., real time imaging or sensor data, or online digital content), or the high speed of analysis (e.g., real-time threat detection in defense applications, online fraud detection, digital advertising routing, high frequency trading, etc.).
- Big Data Variation refers to datasets and corresponding fields where the data elements, or units of observations can have large variability that makes analysis hard. For example, in medicine one variable (diagnosis) may take thousands of values that can further be organized in interrelated hierarchically organized disease types.

According to another definition, the aspect of data analysis that characterizes Big Data Analytics problems is its overall difficulty relative to current state of the art analytic capabilities. A broader definition of Big Data Analytics problems is thus adopted by some (e.g., the National Institutes of Health (NIH)), to denote all analysis situations that press the boundaries or exceed the capabilities of the current state of the art in analytics systems and technology. According to this definition, "hard" analytics problems are de facto part of Big Data Analytics [3].

2. Types of Data Analysis

The main types of data analytics [4] are:
a. Classification for Diagnostic or Attribution Analysis: where a typically computer-implemented system produces a table of assignments of objects into predefined categories on the basis of object characteristics.
    Examples: medical diagnosis; email spam detection; separation of documents as responsive and unresponsive in litigation.
b. Regression for Diagnostic Analysis: where a typically computer-implemented system produces a table of assignments of numerical values to objects on the basis of object characteristics.
    Examples: automated grading of essays; assignment of relevance scores to documents for information retrieval; assignment of probability of fraud to a pending credit card transaction.
c. Classification for Predictive Modeling: where a typically computer-implemented system produces a table of assignments of objects into predefined categories on the basis of object characteristics and where values address future states (i.e., system predicts the future).
    Examples: expected medical outcome after hospitalization; classification of loan applications as risky or not with respect to possible future default; prediction of electoral results.
d. Regression for Predictive Modeling: where a typically computer-implemented system produces a table of assignments of numerical values to objects on the basis of object characteristics and where values address future states (i.e., system predicts the future).
    Examples: predict stock prices at a future time; predict likelihood for rain tomorrow; predict likelihood for future default on a loan.
e. Explanatory Analysis: where a typically computer-implemented system produces a table of effects of one or more factors on one or more attributes of interest; also producing a catalogue of patterns or rules of influences.
    Examples: analysis of the effects of sociodemographic features on medical service utilization, political party preferences or consumer behavior.
f. Causal Analysis: where a typically computer-implemented system produces a table or graph of causes-effect relationships and corresponding strengths of causal influences describing thus how specific phenomena causally affect a system of interest.
    Example: causal graph models of how gene expression of thousands of genes interact and regulate development of disease or response to treatment; causal graph models of how socioeconomic factors and media exposure affect consumer propensity to buy certain products; systems that optimize the number of experiments needed to understand the causal structure of a system and manipulate it to desired states.
g. Network Science Analysis: where a typically computer-implemented system produces a table or graph description of how entities in a big system inter-relate and define higher level properties of the system.
    Example: network analysis of social networks that describes how persons interrelate and can detect who is married to whom; network analysis of airports that reveal how the airport system has points of vulnerability (i.e., hubs) that are responsible for the adaptive properties of the airport transportation system (e.g., ability to keep the system running by rerouting flights in case of an airport closure).
h. Feature selection, dimensionality reduction and data compression: where a typically computer-implemented system selects and then eliminates all variables that are irrelevant or redundant to a classification/regression, or explanatory or causal modeling (feature selection) task;

or where such as system reduces a large number of variables to a small number of transformed variables that are necessary and sufficient for classification/regression, or explanatory or causal modeling (dimensionality reduction or data compression).

Example: in order to perform web classification into family-friendly ones or not, web site contents are first cleared of all words or content that is not necessary for the desired classification.

i. Subtype and data structure discovery: where analysis seeks to organize objects into groups with similar characteristics or discover other structure in the data.

Example: clustering of merchandize such that items grouped together are typically being bought together, grouping of customers into marketing segments with uniform buying behaviors.

j. Feature construction: where a typically computer-implemented system pre-processes and transforms variables in ways that enable the other goals of analysis. Such pre-processing may be grouping, abstracting, existing features or constructing new features that represent higher order relationships, interactions etc.

Example: when analyzing hospital data for predicting and explaining high-cost patients, co-morbidity variables are grouped in order to reduce the number of categories from thousands to a few dozen which then facilitates the main (predictive) analysis; in algorithmic trading, extracting trends out of individual time-stamped variables and replacing the original variables with trend information facilitates prediction of future stock prices.

k. Data and analysis parallelization, chunking, and distribution: where a typically computer-implemented system performs a variety of analyses (e.g., predictive modeling, diagnosis, causal analysis) using federated databases, parallel computer systems, and modularizes analysis in small manageable pieces, and assembles results into a coherent analysis.

Example: in a global analysis of human capital retention a world-wide conglomerate with 2,000 personnel databases in 50 countries across 1,000 subsidiaries, can obtain predictive models for retention applicable across the enterprise without having to create one big database for analysis.

Important note about terminology: in common everyday use (e.g., in common parlance, in the business analytics and even in parts of the scientific and technical literature) the term "predictive modeling" is used as general-purpose term for all analytic types a, b, c, d, e without discrimination. This is for narrative convenience since it is much less cumbersome to state, for example, that "method X is a predictive modeling method" as opposed to the more accurate but inconvenient "method X is a method that can be used for Classification for Diagnostic or Attribution Analysis, and/or Regression for Diagnostic Analysis, and/or Classification for Predictive Modeling, and/or Regression for Predictive Modeling, and/or Explanatory Analysis". In those cases it is inferred from context what is the precise type of analysis that X is intended for or was used etc.

In the present application we utilize this simplifying terminological convention and refer to "predictive modeling" as the application field of the invention to cover analysis types a, b, c, d, and e.

3. Specific Examples of Data Analytics Application Areas

The following Listing provides examples of some of the major fields of application for the invented system specifically, and Data Analytics more broadly [5]:

1. Credit risk/Creditworthiness prediction.
2. Credit card and general fraud detection.
3. Intention and threat detection.
4. Sentiment analysis.
5. Information retrieval, filtering, ranking, and search.
6. Email spam detection.
7. Network intrusion detection.
8. Web site classification and filtering.
9. Matchmaking.
10. Predict success of movies.
11. Police and national security applications
12. Predict outcomes of elections.
13. Predict prices or trends of stock markets.
14. Recommend purchases.
15. Online advertising.
16. Human Capital/Resources: recruitment, retention, task selection, compensation.
17. Research and Development.
18. Financial Performance.
19. Product and Service Quality.
20. Client management (selection, loyalty, service).
21. Product and service pricing.
22. Evaluate and predict academic performance and impact.
23. Litigation: predictive coding, outcome/cost/duration prediction, bias of courts, voire dire.
24. Games (e.g., chess, backgammon, jeopardy).
25. Econometrics analysis.
26. University admissions modeling.
27. Mapping fields of activity.
28. Movie recommendations.
29. Analysis of promotion and tenure strategies.
30. Intension detection and lie detection based on fMRI readings.
31. Dynamic Control (e.g., autonomous systems such as vehicles, missiles; industrial robots; prosthetic limbs).
32. Supply chain management.
33. Optimizing medical outcomes, safety, patient experience, cost, profit margin in healthcare systems.
34. Molecular profiling and sequencing based diagnostics, prognostics, companion drugs and personalized medicine.
35. Medical diagnosis, prognosis and risk assessment.
36. Automated grading of essays.
37. Detection of plagiarism.
38. Weather and other physical phenomena forecasting.

The present invention in particular addresses two ubiquitous and pressing problems of modern data modeling and analysis.

1. Many modern pattern recognition technologies produce models with excellent predictivity but are "black boxes", that are opaque to the user. These predictive models typically learn from a large number of input features (i.e., hundreds or thousands of variables). The model output is a single value such as a binary classification, probability value, or score. It may be difficult to interpret the meaning of the model output or understand what the model is learning.

2. Many modern pattern recognition technologies produce models with excellent predictivity but are too large, and/or expensive to execute in less powerful computing platforms. In some cases a model developed using a super computer needs be applied in a less powerful platform for example a mobile device (e.g., cellphone, tablet), a lightweight web client, or even in pen and paper formats.

The present invention addresses the above two problems and can be applied to a multitude of real life applications as follows:

1. The invention "opens up" a black box model by converting it to a compact and understandable model that is functionally equivalent. The benefits include:

Being able to understand the model, how it works, and why it produces the outputs it produces.

It can help convince human users that the learnt function is a reasonable one for the task and facilitate acceptance of models.

Understandable models also enable the generation of hypotheses and improved understanding of the underlying process that produces the data.

Furthermore the invention can be used to model and understand the decision making of humans by first modeling their decisions (outputs) when presented with specific inputs and then converting the models to predictively equivalent ones that are easier to decipher.

The invention can also be used to compare the behavior of a human or computerized decision process against another. It can thus be used to compare among human decision makers, between novice and expert decision makers, between human decision makers and standardized guidelines for the application field. Therefore the method can be a useful tool for enhancing education and guideline compliance/adherence detection and improvement.

2. The invention converts a predictive model into a functionally equivalent model into a form that can be implemented and deployed more easily or efficiently.

The invention can be applied to practically any field where predictive modeling (with the expanded meaning we defined earlier) is desired. Because it relies on extremely broad distributional assumptions that are valid in numerous fields it is application field-neutral (i.e., it is applicable across all fields).

BRIEF DESCRIPTION OF THE FIGURES

FIG. 2 compares the performance between an example "black box" model (i.e., an SVM) and a decision tree. The results show that it is possible to create an explainable model that produces similar outputs to a black box model.

DETAILED DESCRIPTION OF THE INVENTION

Figure 1:
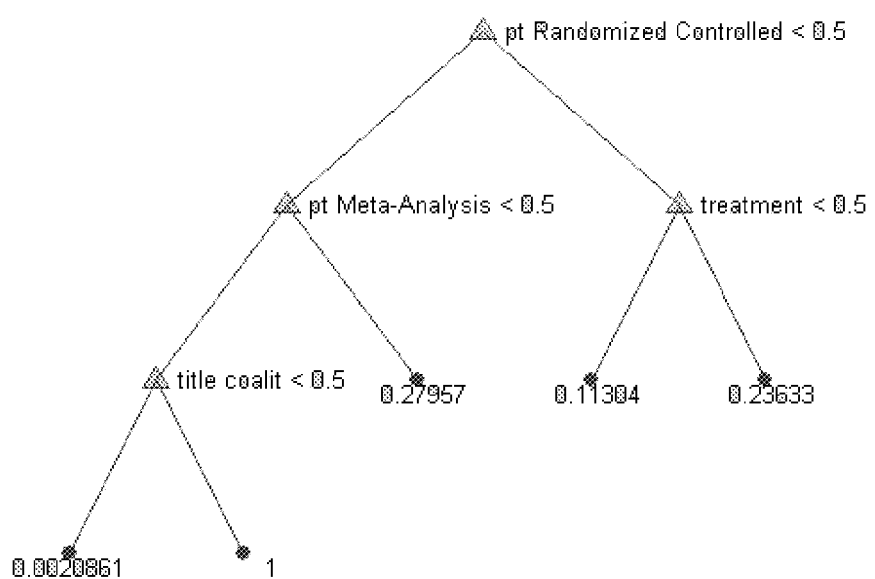
FIG. 1 is an example of a decision tree that was learned for a biomedical application where a model was trained to identify high quality content-specific articles.

The novel method comprises of the following series of steps:

1. Learn a model M1 from dataset D.
2. Generate a model B1 of the distribution of input variables in D (using any method that can model a joint probability distribution; a prototypical method being state of the art Bayesian network induction techniques such as method MMHC [6] or HITON-Bach [7-9]).
3. Generate input patterns from B1 or D using statistical sampling, eg:
   a. Resampling from D with uniform probability with or without replacement; or
   b. Sample joint patterns of input variables proportionately to the pattern probability; or
   c. Generate all high probability input patterns and sample over remaining ones proportionately to their probability; or
   d. Using logic sampling on B1 (i.e., uniformly randomly over space of joint input patterns); or any of a number of sampling methods that are commonly employed in statistics, engineering or pattern recognition to sample from a joint distribution.
4. Create new data D1 that comprises of the generated inputs followed by the corresponding M1 model-estimated outputs. Input patterns are instantiations of the variables, and feeding input patterns to M1 produces new outputs.
5. Derive all or multiple Markov Boundaries ($MB^1, \ldots, MB^n$) of the response variable (eg by application of appropriately instantiated TIE* method on D1).
6. From each Markov Boundary (i.e., $MB^i$), learn a decision tree $DT^i$ using standard decision tree induction (e.g., using CART, ID3 or other Decision Tree learning method [10, 11]). Optionally, prune each tree using standard pruning methods. Verify and fine tune each decision tree (i.e., $DT^i$) to capture the outputs of M1 within acceptable accuracy e. Keep only the Markov Boundaries that satisfy this condition.
7. The catalogue of all validated models $DT^i$ comprises of the complete final set of equivalent explanations of the function contained in model M1.

The model trained in step 1 is the model that we would like to explain or convert into a more easily understandable format. An example classifier is support vector machine (SVM) models, but the method can be used with practically all modeling methods. Steps 2 and 3 facilitate generation of new data D1. Data can be generated using other procedures besides Bayesian networks, which were mentioned as a preferred example method. D1 is created (step 4) on one hand to increase the sample size and on the other hand to provide a more general description of the underlying function that is modeled, beyond the finite set of original training inputs. When the training data is small, however, it may not have enough samples to fully illustrate the underlying function or relationship between the inputs and target variable. In this case, it is not possible to learn a fully representative model. Generating new data also provides more examples so that the underlying function can be learned more accurately.

Step 5 performs feature selection to reduce the dimensionality of the input space for decision tree learning. The Markov Boundary of a variable is typically a very small subset of the original input variables but is mathematically guaranteed to contain all predictive information about the variable that is contained in the full data. Thus the Markov boundary compresses the data by feature selection in an optimal manner. TIE* is an example of a Markov Boundary induction method. Feature selection can be performed in this step with other suitable feature selection methods, and TIE* was used as a preferred example. Step 6 produces decision trees that yield similar outputs to those produced by M1 and have similar performance.

In step 7, the decision tree models can be combined to provide an explanation of model M1. One example method is converting the decision trees to a Boolean expression Each decision tree leaf represents a path from the root that maps to a distinct Boolean expression. For binary trees, the juncture at a tree node represents the presence or absence of a variable. For continuous values, the node represents whether a value is greater than or less than a threshold value.

One of the primary benefits of the novel method is that it learns and combines multiple Markov Boundaries and decision trees so that it does not throw away significant parts of the learnt function. Techniques that use a single Markov Boundary (or a single selected feature set more broadly) suffer from this limitation.

Another benefit of the inventive method is that it probes the learnt model M1 and examines its behavior outside the narrow scope of previously encountered cases. It simulates cases that range from mildly unexpected to greatly unexpected cases relative to the training cases. As a result, it can identify the limits and potential breaking points of the learnt black box model.

A final benefit is that we can elect to use all or a subset of induced Markov Boundaries according to the intended use of the converted model when simplifying or converting the black box model to a simpler model.

There are a number of possible variations of the method. A highly simplified version of the method can use the original data without generating new cases. Also, learning a single Markov Boundary can be performed instead of learning multiple Markov Boundaries. Another modification involves performing feature selection before training model M1 so that model training would use the feature subset rather than all features.

A simplified instantiation of the general method which has the practical benefits of higher speed and higher implementation simplicity over the full method comprises of the following series of steps:

1. Learn a model M1 from data D.
2. Use a Markov Boundary induction method to derive a Markov Boundary of the response variable.
3. From the Markov Boundary, learn a decision tree DT using standard decision tree induction on the original data D. Optionally, prune the tree using standard pruning methods. Verify that the decision tree closely captures the outputs of M1.
4. Convert the decision tree into the final explanation of the function contained in model M1.

Experimental Demonstration and Testing of Method:

FIG. 1 is an example of a decision tree produced by the new method when applied on data from a biomedical predictive modeling application. The purpose of the predictive modeling was to identify high quality content-specific articles in the domain of internal medicine [12]. The original set of input features was over 20000 variables. After performing feature selection using a Markov Boundary induction method, the number of features was reduced to 13 features. A decision tree with 4 features was then learned. FIG. 2 shows performance of the decision tree compared to an SVM (i.e., the original black box model in this example). The results show that it is possible to create an explainable model that produces similar outputs to a black box model or classifier.

Both the original black box SVM model and the converted decision tree evaluate articles based on the occurrence of terms in the articles. To understand the decision tree, we start from the top (root node) and move to the bottom (to a leaf node). The left branch at a node means that a term is absent, and the right branch means that a term is present. In cases where the nodes represent numerical values, the left branch means that a variable is less than a threshold value while the right branch means the variable is greater than or equal to the threshold value. In other words, each path from the root to a leaf node corresponds to a rule that can be applied to a document to classify it. The whole tree is a set of rules that can be collectively used to classify the documents. The leaves indicate the probability of a high quality treatment related document. The leaf can also be a continuous value or classification.

Figure 3:
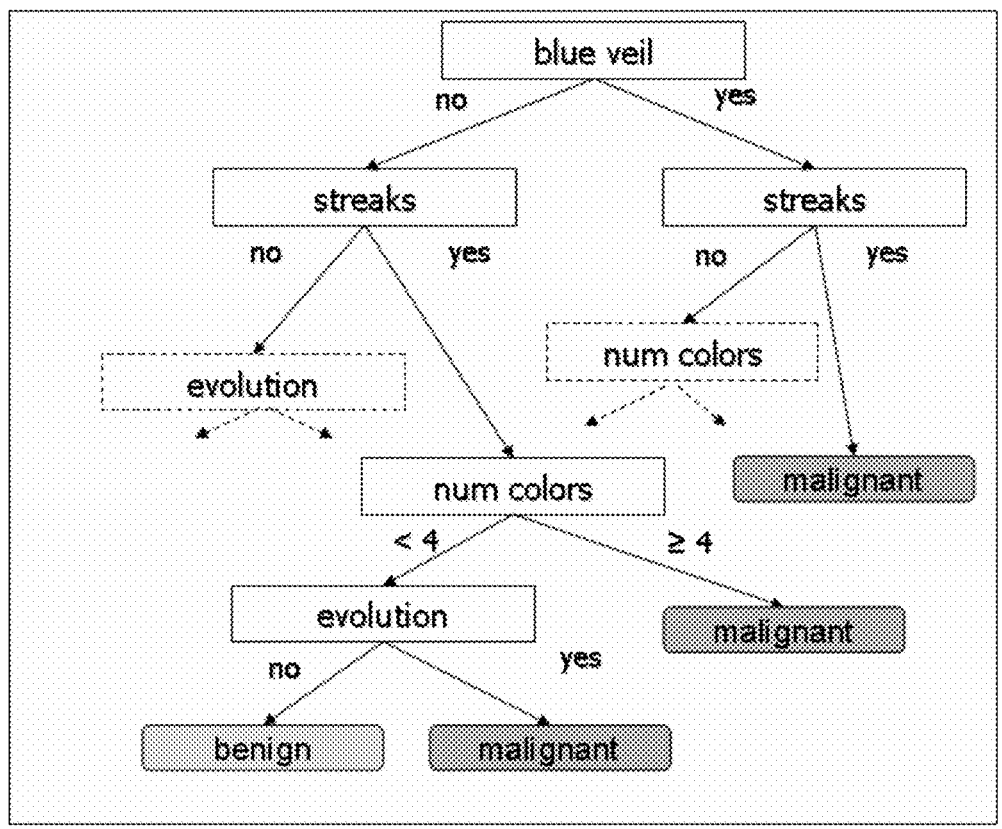
FIG. 3 is an example of a decision tree that was learned for a biomedical application where SVM classifiers were trained to model clinical decision making of dermatologists in diagnosing malignant melanomas.

FIG. 3 shows application of the method to another biomedical predictive modeling example. In this example, SVMs were trained to model clinical decision making of dermatologists in diagnosing malignant melanomas. By application of the inventive method the SVM black box for each dermatologist is converted to an equivalent decision tree which is easily understood by physicians (who are very familiar with clinical decision trees by training). It was verified that decision trees closely captured the outputs of the SVMs by analyzing the coefficient of determination ($R^2$) between SVM and decision tree output for all physicians. It was very high for all the physician's decision tree models (average: 0.99, range [0.94,1.00]). This decision tree represents the decision making process for an individual dermatologist. In the presented example a dermatologist classifies a lesion as malignant if blue veil and streaks are present.

ABBREVIATIONS

HITON-Bach—A state of the art method for learning a causal graph from data; it combines local causal learning and edge orientation by Bach's scoring function.
MMHC (Max-Min Hill Climbing)—A state of the art method for learning a causal graph from data.
SVM (Support Vector Machines): A state of the art method for classification and regression.
TIE* (Target Information Equivalency)—A state of the art method for multiple Markov boundary discovery from data; it is also used to find all local causal pathways that are statistically indistinguishable from the data.

Method and System Output, Presentation, Storage, and Transmittance

The relationships, correlations, and significance (thereof) discovered by application of the method of this invention may be output as graphic displays (multidimensional as required), probability plots, linkage/pathway maps, data tables, and other methods as are well known to those skilled in the art. For instance, the structured data stream of the method's output can be routed to a number of presentation, data/format conversion, data storage, and analysis devices including but not limited to the following: (a) electronic graphical displays such as CRT, LED, Plasma, and LCD screens capable of displaying text and images; (b) printed graphs, maps, plots, and reports produced by printer devices and printer control software; (c) electronic data files stored and manipulated in a general purpose digital computer or other device with data storage and/or processing capabilities; (d) digital or analog network connections capable of transmitting data; (e) electronic databases and file systems. The data output is transmitted or stored after data conversion and formatting steps appropriate for the receiving device have been executed.

Software and Hardware Implementation

Figure 4:
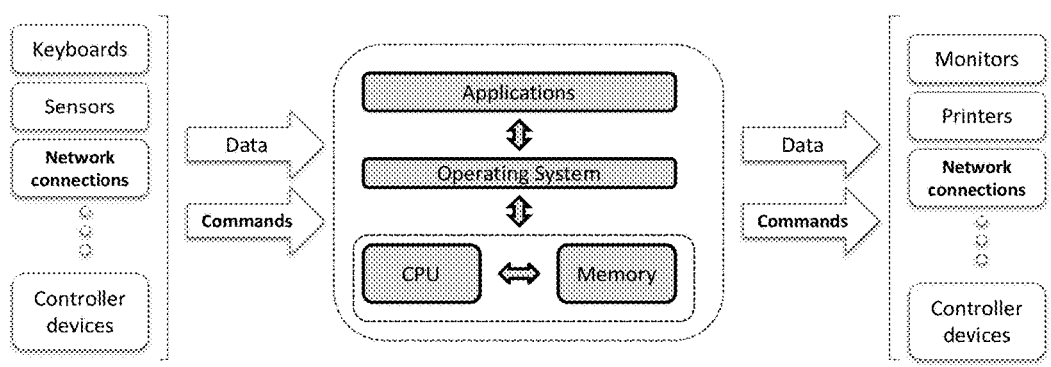
FIG. 4 shows the organization of a general-purpose modern digital computer system such as the ones used for the typical implementation of the invention.

Due to large numbers of data elements in the datasets, which the present invention is designed to analyze, the invention is best practiced by means of a general purpose digital computer with suitable software programming (i.e., hardware instruction set) (FIG. 4 describes the architecture of modern digital computer systems). Such computer systems are needed to handle the large datasets and to practice the method in realistic time frames. Based on the complete disclosure of the method in this patent document, software code to implement the invention may be written by those reasonably skilled in the software programming arts in any one of several standard programming languages including, but not limited to, C, Java, and Python. In addition, where applicable, appropriate commercially available software programs or routines may be incorporated. The software program may be stored on a computer readable medium and implemented on a single computer system or across a network of parallel or distributed computers linked to work as one. To implement parts of the software code, the inventors have used MathWorks Matlab® and a personal computer with an Intel Xeon CPU 2.4 GHz with 24 GB of RAM and 2 TB hard disk.

REFERENCES

1. Davenport T H, Harris J G: Competing on analytics: the new science of winning: Harvard Business Press; 2013.
2. Douglas L: The Importance of 'Big Data': A Definition. *Gartner* (June 2012) 2012.
3. NIH Big Data to Knowledge (BD2K) [http://bd2k.nih.gov/about_bd2k.html#bigdata]
4. Provost F, Fawcett T: Data Science for Business: What you need to know about data mining and data-analytic thinking: "O'Reilly Media, Inc."; 2013.
5. Siegel E: Predictive Analytics: The Power to Predict Who Will Click, Buy, Lie, or Die: John Wiley & Sons; 2013.
6. Tsamardinos I, Brown L E, Aliferis C F: The Max-Min Hill-Climbing Bayesian Network Structure Learning Algorithm. *Machine Learning* 2006, 65(1):31-78.
7. Aliferis C F, Statnikov A, Tsamardinos I, Mani S, Koutsoukos X D: Local Causal and Markov Blanket Induction for Causal Discovery and Feature Selection for Classification. Part II: Analysis and Extensions. *Journal of Machine Learning Research* 2010, 11:235-284.
8. Aliferis C F, Statnikov A, Tsamardinos I, Mani S, Koutsoukos X D: Local Causal and Markov Blanket Induction for Causal Discovery and Feature Selection for Classification. Part I: Algorithms and Empirical Evaluation. *Journal of Machine Learning Research* 2010, 11:171-234.
9. Narendra V, Lytkin N I, Aliferis C F, Statnikov A: A comprehensive assessment of methods for de-novo reverse-engineering of genome-scale regulatory networks. *Genomics* 2011, 97(1):7-18.
10. Mitchell T: Machine learning. New York, N.Y., USA: McGraw-Hill; 1997.
11. Breiman L: Classification and regression trees. Belmont, Calif.: Wadsworth International Group; 1984.
12. Aphinyanaphongs Y, Tsamardinos I, Statnikov A, Hardin D, Aliferis C F: Text categorization models for high-quality article retrieval in internal medicine. *J Am Med Inform Assoc* 2005, 12(2):207-216.

We claim:

1. A computer-implemented method and system for converting predictive models to equivalent models comprising the following steps:
   a) learning a model, M1, from dataset D;
   b) generating a model, B1, of the distribution of input variables in D;
   c) generating input patterns from B1 or D using statistical sampling;
   d) creating new dataset, D1, that consists of the generated inputs followed by the corresponding M1 model-estimated outputs;
   e) deriving all or multiple Markov Boundaries ($MB^1, \ldots, MB^n$) of the response variable by application of appropriately instantiated TIE* method on D1;
   f) learning from each Markov Boundary (i.e., $MB^i$), an equivalent representation, $DT^i$, which is easier to understand by humans or is easier to implement in practical application settings;
   g) verifying and fine tuning each equivalent model to capture the outputs of M1 within acceptable accuracy e;
   h) keeping only the Markov Boundaries that satisfy the condition of step g); and
   i) outputting the catalogue of all validated models $DT^i$ comprising the complete final set of equivalent explanations of the function contained in model M1.

2. The computer-implemented method and system of claim 1 in which Bayesian network induction techniques are used in step b) to generate model B1.

3. The computer-implemented method and system of claim 1 in which step c) is implemented using one of the following methods:
   a) resampling from D with uniform probability with or without replacement; or
   b) sampling joint patterns of input variables proportionately to the pattern probability; or
   c) generating all high probability input patterns and sample over remaining ones proportionately to their probability; or
   d) using logic sampling on B1 (i.e., uniformly randomly over space of joint input patterns); or any of a number of sampling methods that are commonly employed in statistics, engineering or pattern recognition to sample from a joint distribution.

4. The computer-implemented method and system of claim 1 in which step f) uses as equivalent representation decision trees, rule sets, or their equivalent logical expressions and where these are learned either by direct application of decision trees learners, rule learners and logical expression learners or by learning decision trees and then converting them to rules and/or logical expressions.

5. A computer-implemented method and system for converting predictive models to equivalent models comprising the following steps:
   a) learning a model, M1, from dataset D;
   b) deriving a single Markov Boundary (MB) of the response variable by application of a Markov Boundary induction method on D;
   c) learning from the original data D using only the Markov Boundary variables a single decision tree, which is easier to understand by humans or is easier to implement in practical application settings, using standard decision tree induction;
   d) the decision tree is optionally pruned using standard pruning methods;
   e) verifying that the decision tree captures the outputs of M1 within acceptable accuracy e;
   f) optionally converting the decision tree into equivalent rules or logical expressions; and
   g) outputting the decision tree and its equivalent rules or logical expressions.

6. Applying the computer-implemented method and system of claim 1 on data from several computer or human decision makers to compare performance with expert decision makers or decision policy comprising the following steps:
- a) comparing the input and output pattern pairs of the models demonstrating the decision making processes of the diverse decision makers;
- b) establishing by means of the comparisons in step a) the specific input patterns for which decision makers agree or disagree;
- c) comparing the input and output pattern pairs of the models capturing the decision making processes of the diverse decision makers, with the outputs prescribed by a decision policy or by an expert decision maker, for the same set of inputs;
- d) establishing by means of the comparisons in step c) that a decision maker is compliant or non-compliant with a decision policy or expert decision maker; and
- e) using the input patterns that trigger false or non-compliant decisions identified in step d) for notifying, educating, correcting, or over-riding decision makers and providing them with the input patterns that trigger false or non-compliant decisions and with corrected decisions as dictated by the decision policy or expert decision maker.

7. Applying the computer-implemented method and system of claim 5 on data from several computer or human decision makers to compare performance with expert decision makers or decision policy comprising the following steps:
- a) comparing the input and output pattern pairs of the models demonstrating the decision making processes of the diverse decision makers;
- b) establishing by means of the comparisons in step a) the specific input patterns for which decision makers agree or disagree;
- c) comparing the input and output pattern pairs of the models capturing the decision making processes of the diverse decision makers, with the outputs prescribed by a decision policy or by an expert decision maker, for the same set of inputs;
- d) establishing by means of the comparisons in step c) that a decision maker is compliant or non-compliant with a decision policy or expert decision maker; and
- e) using the input patterns that trigger false or non-compliant decisions identified in step d) for notifying, educating, correcting, or over-riding decision makers and providing them with the input patterns that trigger false or non-compliant decisions and with corrected decisions as dictated by the decision policy or expert decision maker.

* * * * *